United States Patent
Hampton et al.

(10) Patent No.: US 11,089,196 B1
(45) Date of Patent: Aug. 10, 2021

(54) CAPACITIVE SWITCH FOR CONTROLLING A CAMERA MODULE FOR AN INFORMATION HANDLING SYSTEM

(71) Applicant: Dell Products L.P., Round Rock, TX (US)

(72) Inventors: Patrick A. Hampton, Round Rock, TX (US); Christian L. Critz, Liberty Hill, TX (US); Michael David, Austin, TX (US); Ernesto Ramirez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/855,323

(22) Filed: Apr. 22, 2020

(51) Int. Cl.
 *H04N 5/225* (2006.01)
 *G06F 1/16* (2006.01)

(52) U.S. Cl.
 CPC ......... *H04N 5/2257* (2013.01); *G06F 1/1605* (2013.01); *H04N 5/2252* (2013.01); *H04N 5/2254* (2013.01)

(58) Field of Classification Search
 CPC .. H04N 5/2257; H04N 5/2254; H04N 5/2252; G06F 1/1605
 See application file for complete search history.

(56) References Cited

U.S. PATENT DOCUMENTS

| 2007/0153119 A1* | 7/2007 | Bilbrey ................. H04N 7/142 348/373 |
| 2014/0111953 A1* | 4/2014 | McClure ................ H05K 1/147 361/749 |
| 2019/0114021 A1* | 4/2019 | Oliver ..................... G06F 3/044 |
| 2020/0142232 A1* | 5/2020 | Demuth .............. G02F 1/13781 |
| 2021/0127045 A1* | 4/2021 | Clark ..................... H04N 5/232 |

\* cited by examiner

*Primary Examiner* — Timothy J Henn
(74) *Attorney, Agent, or Firm* — Baker Botts L.L.P.

(57) ABSTRACT

A camera module for an information handling system, including: a camera having an electronic shutter; a capacitive sensor positioned proximate to the camera, the capacitive sensor configured to detect a change in capacitance at the capacitive sensor; a shutter controller computing module configured to: receive a first signal from the capacitive sensor indicating the change in capacitance at the capacitive sensor; process the first signal from the capacitive sensor, including determining that the first signal indicates to change a state of the electronic shutter; and in response to determining that the first signal indicates to change the state of the electronic shutter, providing, to the camera module, a second signal to adjust an initial state of the electronic shutter of the camera to a secondary state.

20 Claims, 10 Drawing Sheets

CAPACITIVE SWITCH FOR CONTROLLING A CAMERA MODULE FOR AN INFORMATION HANDLING SYSTEM

BACKGROUND

Field of the Disclosure

The disclosure relates generally to an information handling system, and in particular, a capacitive sensor for a camera module in the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Popularity of both (a) ultra-narrow border bezels of information handling systems and (b) the need for camera privacy for both consumer and commercial products have combined to create a unique challenge of simultaneously meeting both requirements. Ultra-narrow borders leave zero space for moving parts in both of the Y and Z dimensions. Depending on the border size, traditional camera "slider/shutter" designs will drastically impact either Y, Z, or both dimensions.

SUMMARY

Innovative aspects of the subject matter described in this specification may be embodied in an information handling system including a display housing including a first side positioned opposite to a second side, and a top side positioned opposite to a bottom side; a display coupled to the display housing; a cover glass spaced-apart from the second side of the display housing, wherein the display is positioned between the cover glass and the second side of the display housing; a camera module positioned proximate to the cover glass and at the top side of the display housing, the camera module including: a camera having an electronic shutter; a capacitive sensor positioned proximate to the camera, the capacitive sensor configured to detect a change in capacitance at the capacitive sensor; a shutter controller computing module configured to: receive a first signal from the capacitive sensor indicating the change in capacitance at the capacitive sensor; process the first signal from the capacitive sensor, including determining that the first signal indicates to change a state of the electronic shutter; and in response to determining that the first signal indicates to change the state of the electronic shutter, providing, to the camera module, a second signal to adjust an initial state of the electronic shutter of the camera to a secondary state.

Other embodiments of these aspects include corresponding methods, apparatus, and computer programs, configured to perform the actions of the methods, encoded on computer storage devices.

These and other embodiments may each optionally include one or more of the following features. For instance, the camera module configured to: receive the second signal from the shutter control computing module; and in response to the second signal, adjust the initial state of the electronic shutter to the secondary state based on the second signal. Adjusting the initial state of the electronic shutter to the secondary state based on the second signal includes actuating the electronic shutter. The initial state is a closed shutter state, and the secondary state is an open shutter state. The initial state is an open shutter state, and the secondary state is a closed shutter state. The capacitive sensor detects the change of capacitance along the capacitive sensor in a first direction, the shutter controller computing module providing, to the camera module, the second signal to adjust a closed shutter state of the electronic shutter of the camera to an open shutter state based on the change of capacitance along the capacitive sensor in the first direction. The capacitive sensor detects the change of capacitance along the capacitive sensor in a second direction, the shutter controller computing module providing, to the camera module, the second signal to adjust an open shutter state of the electronic shutter of the camera to an closed shutter state based on the change of capacitance along the capacitive sensor in the second direction.

Innovative aspects of the subject matter described in this specification may be embodied in a camera apparatus for an information handling system, comprising: a camera module including: a camera having an electronic shutter; a capacitive sensor positioned proximate to the camera, the capacitive sensor configured to detect a change in capacitance at the capacitive sensor; a shutter controller computing module configured to: receive a first signal from the capacitive sensor indicating the change in capacitance at the capacitive sensor; process the first signal from the capacitive sensor, including determining that the first signal indicates to change a state of the electronic shutter; and in response to determining that the first signal indicates to change the state of the electronic shutter, providing, to the camera module, a second signal to adjust an initial state of the electronic shutter of the camera to a secondary state.

Other embodiments of these aspects include corresponding methods, systems, and computer programs, configured to perform the actions of the methods, encoded on computer storage devices.

These and other embodiments may each optionally include one or more of the following features. For instance, the camera module configured to: receive the second signal from the shutter control computing module; and in response to the second signal, adjust the initial state of the electronic shutter to the secondary state based on the second signal. Adjusting the initial state of the electronic shutter to the secondary state based on the second signal includes actuating the electronic shutter. The initial state is a closed shutter state, and the secondary state is an open shutter state. the initial state is an open shutter state, and the secondary state is a closed shutter state. The capacitive sensor detects the change of capacitance along the capacitive sensor in a first direction, the shutter controller computing module providing, to the camera module, the second signal to adjust a closed shutter state of the electronic shutter of the camera to an open shutter state based on the change of capacitance along the capacitive sensor in the first direction. The capacitive sensor detects the change of capacitance along the capacitive sensor in a second direction, the shutter controller computing module providing, to the camera module, the second signal to adjust an open shutter state of the electronic shutter of the camera to an closed shutter state based on the change of capacitance along the capacitive sensor in the second direction.

Innovative aspects of the subject matter described in this specification may be embodied in a computer-implemented method of adjusting a state of a camera module, the method comprising: receive a first signal from a capacitive sensor indicating a change in capacitance at the capacitive sensor, the capacitive sensor positioned proximate to a camera of a camera module and in communication with the camera; process the first signal from the capacitive sensor, including determining that the first signal indicates to change a state of an electronic shutter, the camera including the electronic shutter; and in response to determining that the first signal indicates to change the state of the electronic timer, providing, to the camera module, a second signal to adjust an initial state of the electronic shutter of the camera to a secondary state.

Other embodiments of these aspects include corresponding systems, apparatus, and computer programs, configured to perform the actions of the methods, encoded on computer storage devices.

These and other embodiments may each optionally include one or more of the following features. For instance, adjusting the initial state of the electronic shutter to the secondary state based on the second signal includes actuating the electronic shutter. The initial state is a closed shutter state, and the secondary state is an open shutter state. The initial state is an open shutter state, and the secondary state is a closed shutter state. The change of capacitance is in a first direction, the method further comprising providing, to the camera module, the second signal to adjust a closed shutter state of the electronic shutter of the camera to an open shutter state based on the change of capacitance along the capacitive sensor in the first direction. The change of capacitance is in a second direction, the method further comprising providing, to the camera module, the second signal to adjust an open shutter state of the electronic shutter of the camera to a closed shutter state based on the change of capacitance along the capacitive sensor in the second direction.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR
EMBODIMENT(S)

This document describes an information handling system including a camera module that provides a seamless user input solution to enable a buttonless and physical shutterless method for camera privacy while maintaining narrow border designs for the information handling system. Specifically, an electronic shutter of the camera module can actuate without input from a user using physical buttons or physical switches.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-9 wherein like numbers are used to indicate like and corresponding parts.

Figure 1:
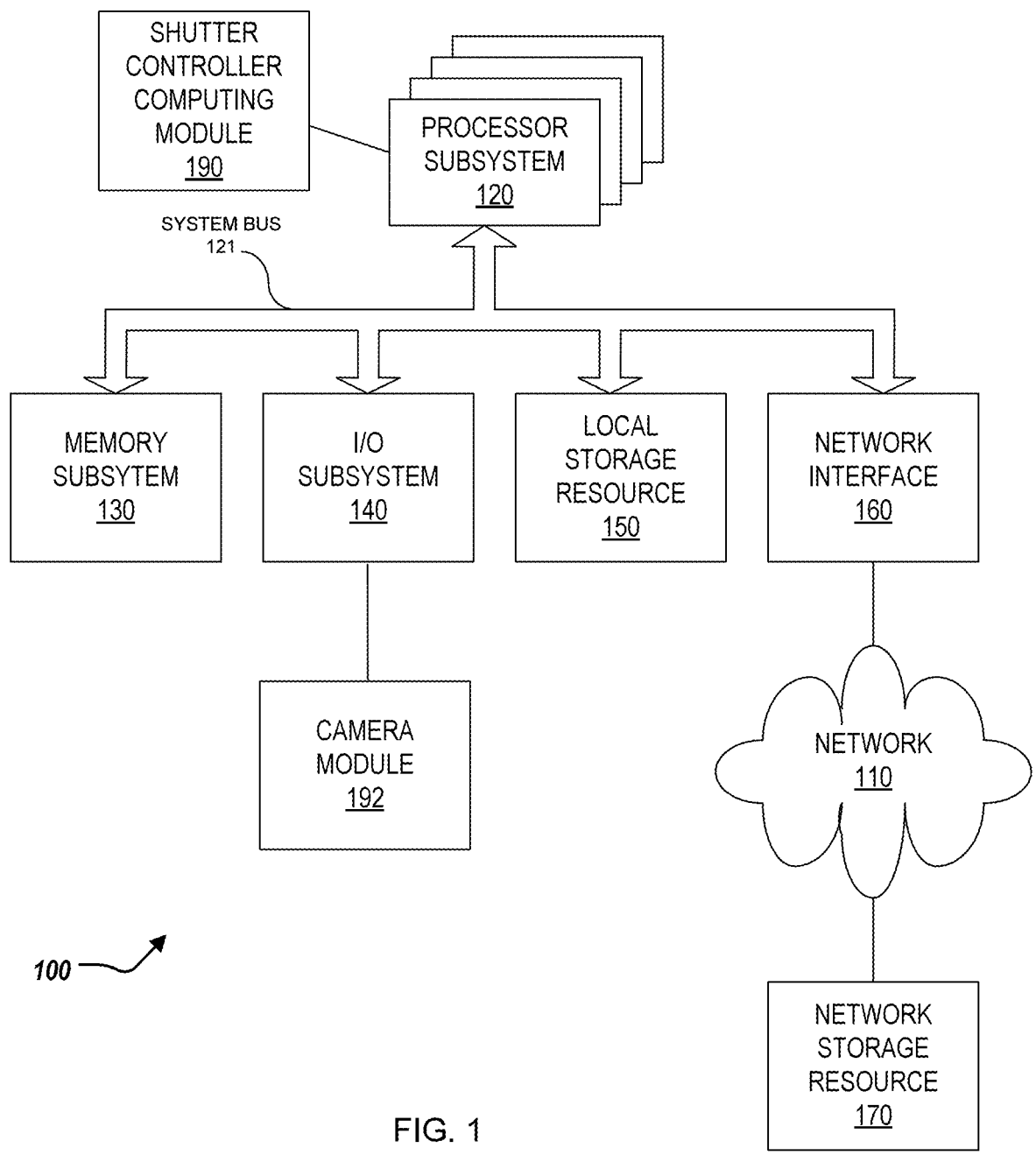
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include a shutter controller computing module 190. For example, the shutter controller computing module 190 can be included by the processor subsystem 120, and/or in communication with the processor subsystem 120. The shutter controller computing module 190 is described further herein.

The information handling system 100 can additionally include a camera module 192 for capturing images, video, or both for further processing by the information handling system 100. The camera module 192 can be included by the I/O subsystem 140, and/or in communication with the I/O subsystem 140. The camera module 192 can be included in a display device (monitor) connected to the information handling system 100 when the information handling system 100 is a desktop computing device—e.g., an external camera module; or can be included within the display device when the information handling system 100 is a desktop computing device—e.g., an internal camera module. In some examples, the camera module 192 can be included within the display device of the information handling system 100 when the information handling system 100 is in all-in-one (AIO) computing device or when the information handling system 100 is a portable computing device (e.g., laptop, tablet, or phone).

Figure 2:
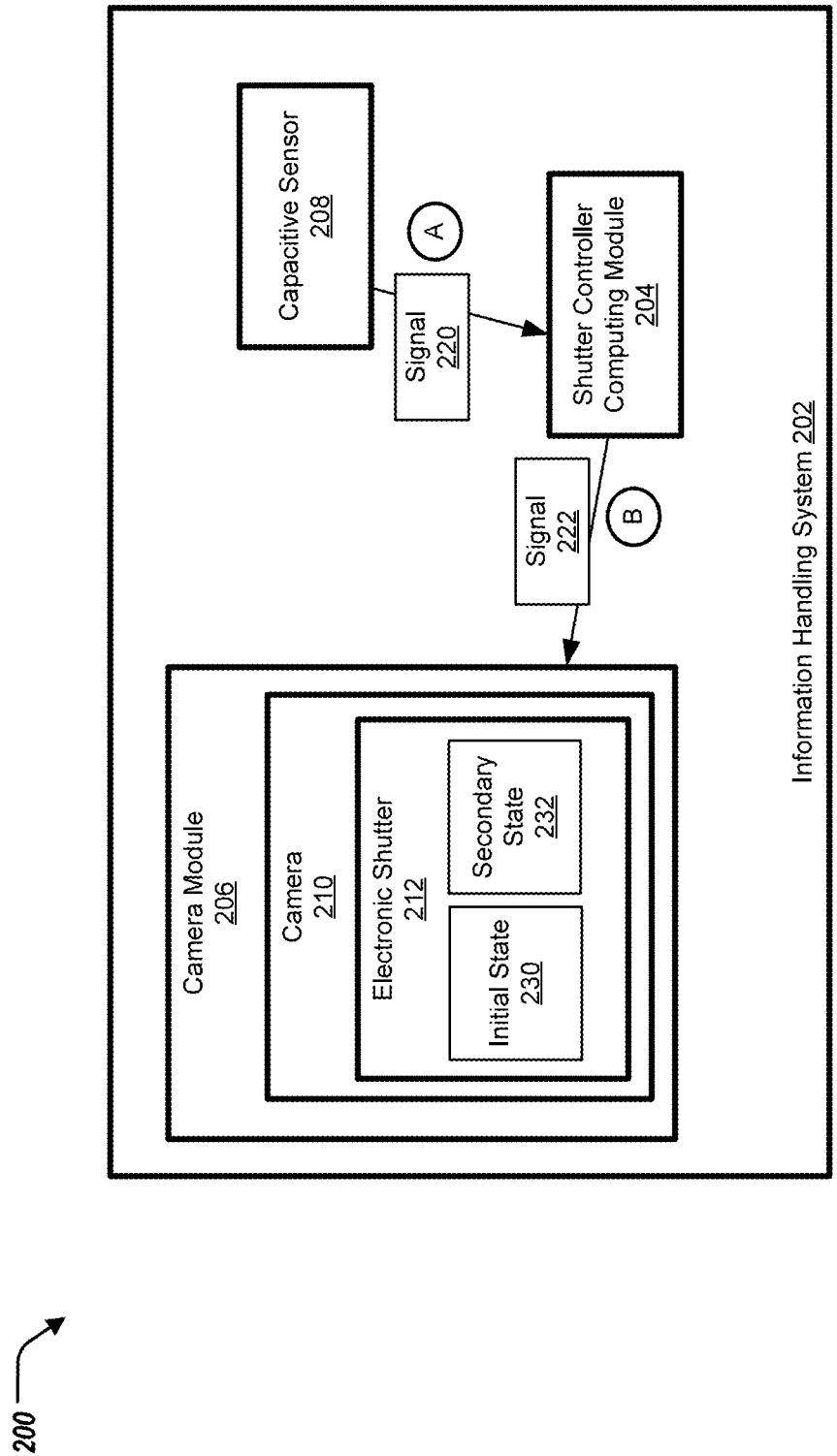
FIG. 2 illustrates a block diagram of the information handling system for adjusting a state of a camera module of the information handling system.

Turning to FIG. 2, FIG. 2 illustrates a computing environment 200 including an information handling system 202. The information handling system 202 can include a shutter controller computing module 204, a camera module 206, and a capacitive sensor 208. The shutter controller computing module 204 can be in communication with the camera module 206 and the capacitive sensor 208. The camera module 206 can include a camera 210. The camera 210 can include an electronic shutter 212. In some examples, the information handling system 202 is similar to, or includes, the information handling system 100 of FIG. 1. In some examples, the shutter controller computing module 204 can be the same, or substantially similar to, the shutter controller computing module 190 of FIG. 1. In some examples, the camera module 206 can be the same, or substantially similar to, the camera module 192 of FIG. 1.

In short, the information handling system 202, and in particular, the shutter controller computing module 204, can provide a seamless user input solution that works with the electronic shutter 212 to enable a buttonless and physical shutterless method for camera privacy while maintaining narrow border designs for the information handling system 202, described further herein. The electronic shutter 212 can actuate without input from a user using physical buttons or physical switches.

The capacitive sensor 208 is configured to detect a change in capacitance at the capacitive sensor 208. For example, the capacitive sensor 208 can detect user input such as proximity, position and displacement, pressure, and force. For example, a user of the information handling system 202 can provide user input to the capacitive sensor 208 by "touching" the capacitive sensor 208. The capacitive sensor 208, in response to such user input, detects a change in capacitance at the capacitive sensor 208.

The shutter controller computing module 204 is configured to receive a first signal 220 from the capacitive sensor 208, at (A). The first signal 220 can indicate the change in capacitance that is detected by the capacitive sensor 208 at the capacitive sensor 208. The shutter controller computing module 204 can process the first signal 220, including determining that the first signal 220 indicates to change the state of the electronic shutter 212. The shutter controller computing module 204, in response to determining that the first signal 220 indicates to change the state of the electronic shutter 212, provides, to the camera module 206, a second signal 222, at (B). The second signal 222 indicates to adjust an initial state 230 of the electronic shutter 212 to a secondary state 232.

The camera module 206 is configured to receive the second signal 222 from the shutter controller computing module 204. The camera module 206, in response to the second signal 222, adjusts the initial state 230 of the electronic shutter 212 to the secondary state 232 based on the second signal 222. Specifically, the camera module 206 can adjust the initial state 230 of the electronic shutter 212 to the secondary state 232 by actuating the electronic shutter 212. That is, when the initial state 230 is a closed shutter state of the electronic shutter 212, the camera module 206 can actuate the electronic shutter 212 such that the secondary state 232 is an open shutter state. When the initial state 230 is an open shutter state of the electronic shutter 212, the camera module 206 can actuate the electronic shutter 212 such that the secondary state 232 is a closed shutter state.

Figure 3:
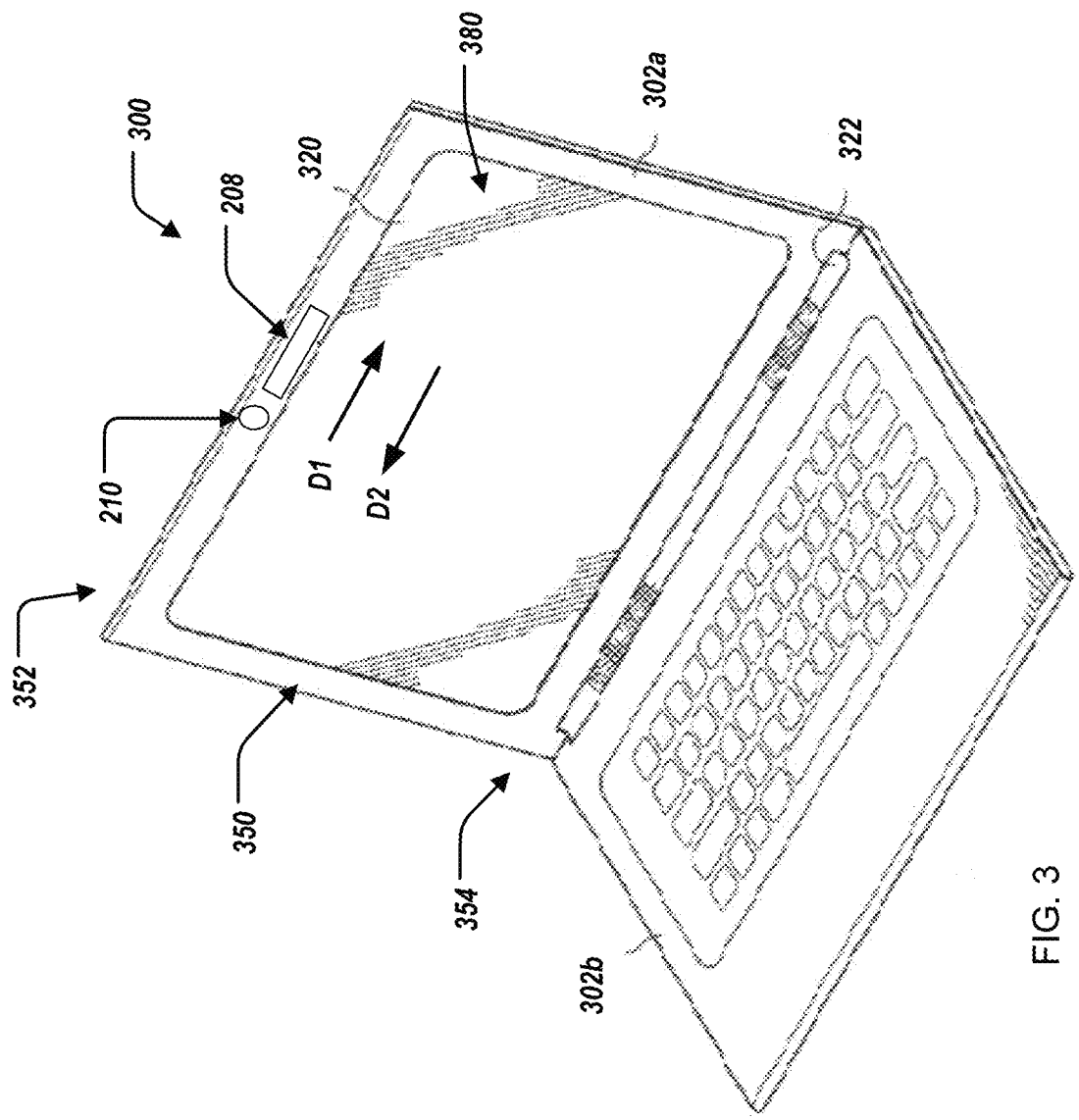
FIG. 3 illustrates the information handling system include two bodies.

Turning now to FIG. 3, FIG. 3 illustrates a dual-body (or two-body) information handling system 300, similar to the information handling system 202 of FIG. 2. The dual-body information handling system 300 can include a first body 302a and a second body 302b (collectively referred to as bodies 302) connected by a hinging apparatus 322. In some examples, the first body 302a can include a display 380 and the second body 302b can include a keyboard, and also include processing components such as the processor subsystem 120 and the shutter controller computing module 204. In some examples, each of the bodies 302 can include a display. The first body 302a can additionally include the camera module 206, including the camera 210; and include the capacitive sensor 208. The first body 302a can include a display housing 350. The display housing 350 can include a top side 352 positioned opposite to a bottom side 354. The first body 302 can include the display 380 coupled to the display housing 350. The capacitive sensor 208 is positioned proximate to the camera 210 at the top side 352 of the display housing 350 of the first body 302a.

Figure 4:
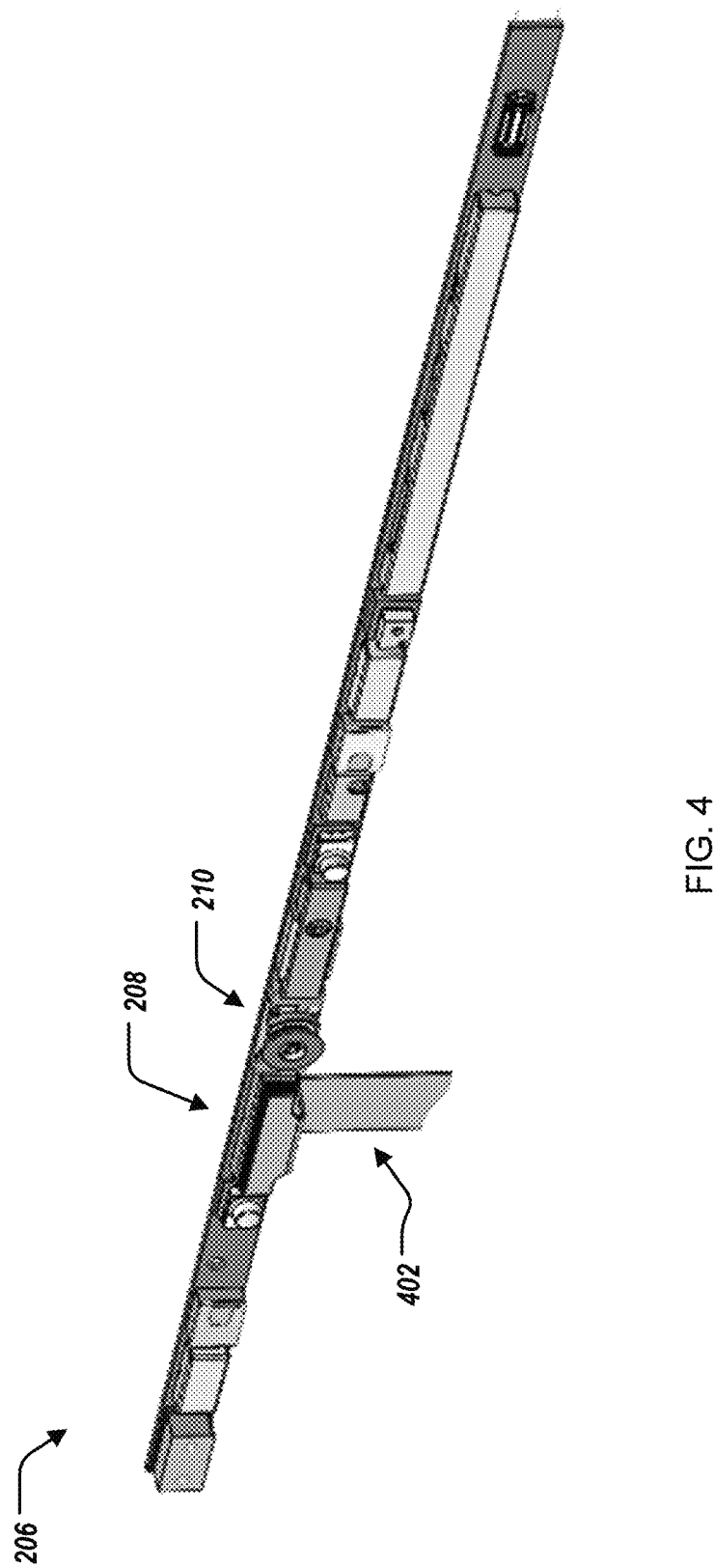
FIG. 4 illustrates an example of the camera module.

FIG. 4 illustrates an example of the camera module 206, including the camera 210 and the capacitive sensor 208. The capacitive sensor 208 can be coupled to a flexible printed circuit (FPC) 402. The FPC 402 can be coupled to the shutter controller computing module 204 that is located in the second body 302b through pathways of the hinging apparatus 322. The FPC 402 provides a communication channel between the capacitive sensor 208 and the shutter controller computing module 204, e.g., for providing the first signal 220. In some examples, the FPC 402 can provide a communication between the camera module 206 and the shutter controller computing module 204, e.g., for providing the second signal 222.

Referring back to FIGS. 2 and 3, the capacitive sensor 208 can detect the change of capacitance along the capacitive sensor 208 in a first direction D1. For example, the user can provide user input by sliding his/her finger along the capacitive sensors 208 in the direction D1. The shutter controller computing module 204 provides, to the camera module 206, the second signal 222 to adjust a closed shutter state (initial state 230) of the electronic shutter 212 to an open shutter state (secondary state 232) based on the change of capacitance along the capacitive sensor 208 along the first direction D1.

Additionally, the capacitive sensor 208 can detect the change of capacitance along the capacitive sensor 208 in a second direction D2. The second direction D2 is opposite to the first direction D1. For example, the user can provide user input by sliding his/her finger along the capacitive sensors 208 in the direction D2. The shutter controller computing module 204 provides, to the camera module 206, the second signal 222 to adjust an open shutter state (initial state 230) of the electronic shutter 212 to a closed shutter state (secondary state 232) based on the change of capacitance along the capacitive sensor 208 along the first direction D2.

Figure 5A:
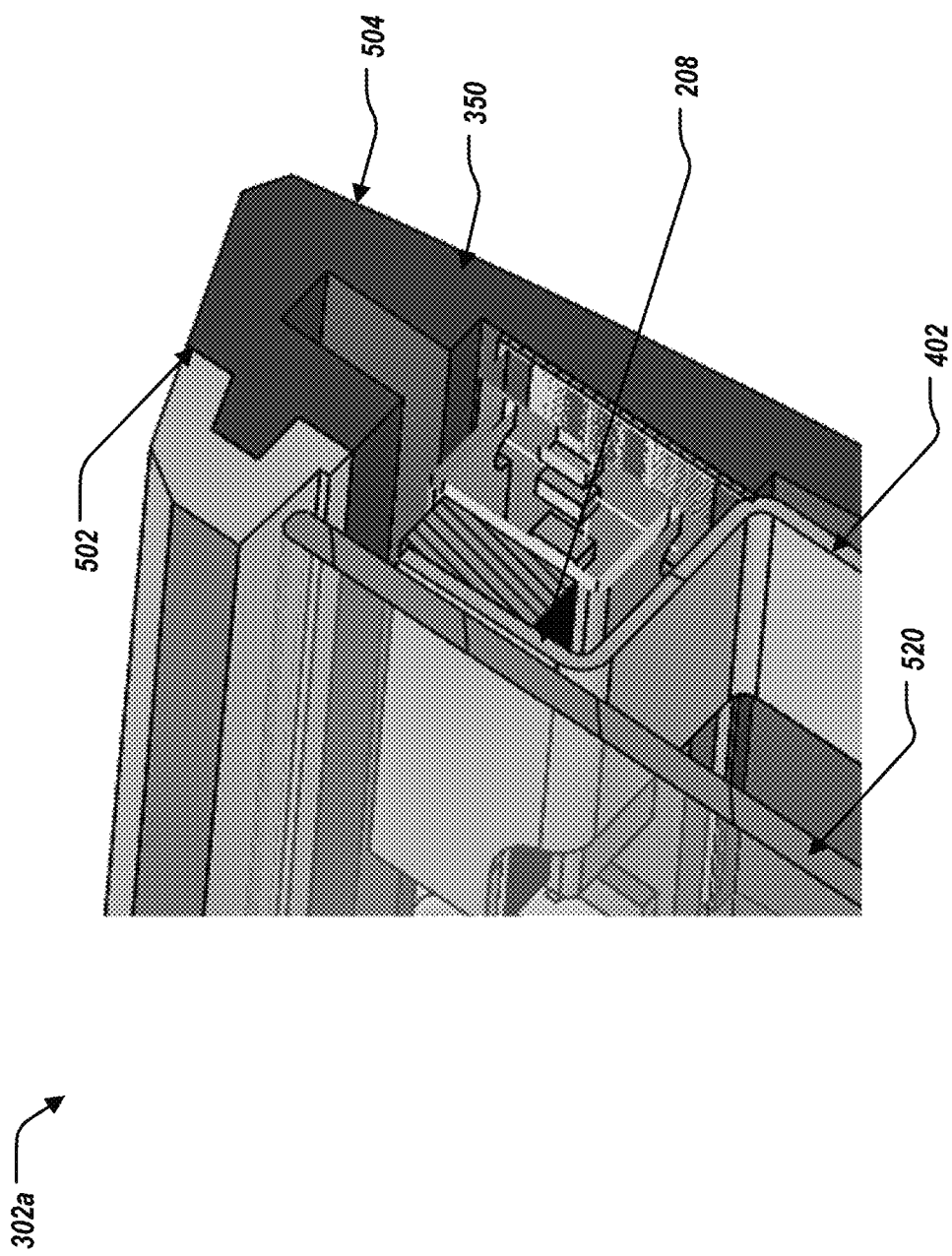
FIG. 5A illustrates a perspective view of a first body of the information handling system.
Figure 5B:
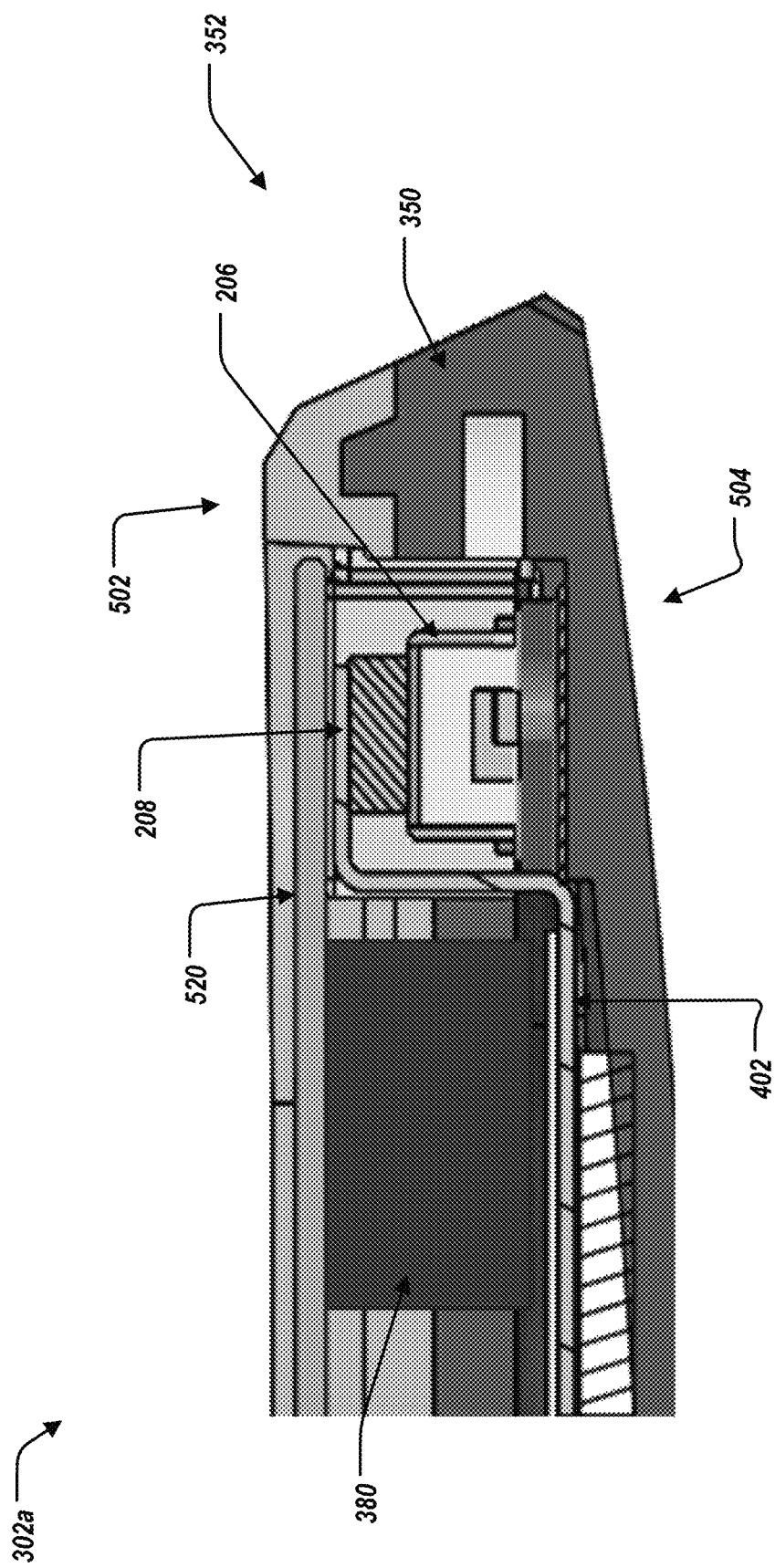
FIG. 5B illustrates a side cut-away view of the first body of the information handling system.

FIGS. 5A, 5B illustrate a perspective view and a side cut-away view of a portion of the first body 302a of the information handling system 300. The display housing 350 includes a first side 502 positioned opposite a second side 504. The display 380 is coupled to the display housing 350. The first body 302a can further include a cover, such as a cover glass 520. The cover glass 520 is spaced apart from the second side 504 of the display housing 350. The display 380 is positioned between the cover glass 520 and the second side 504 of the display housing 350. The camera module 206 is positioned proximate to the cover glass 520 at the top side 352 of the display housing 350 (also as shown in FIG. 3). In some examples, the cover is plastic, or a plastic-based material.

Referring back to FIG. 3, in some examples, the capacitive sensor 308 can include visual cues (i.e., on the cover glass 520) to provide user guidance on where to interact (e.g., swipe) with the capacitive sensor 208. The capacitive sensor 208 can additional include visual elements that provide user feedback on whether the camera 210 is in an open shutter state or a closed shutter state.

Figures 6, 7:
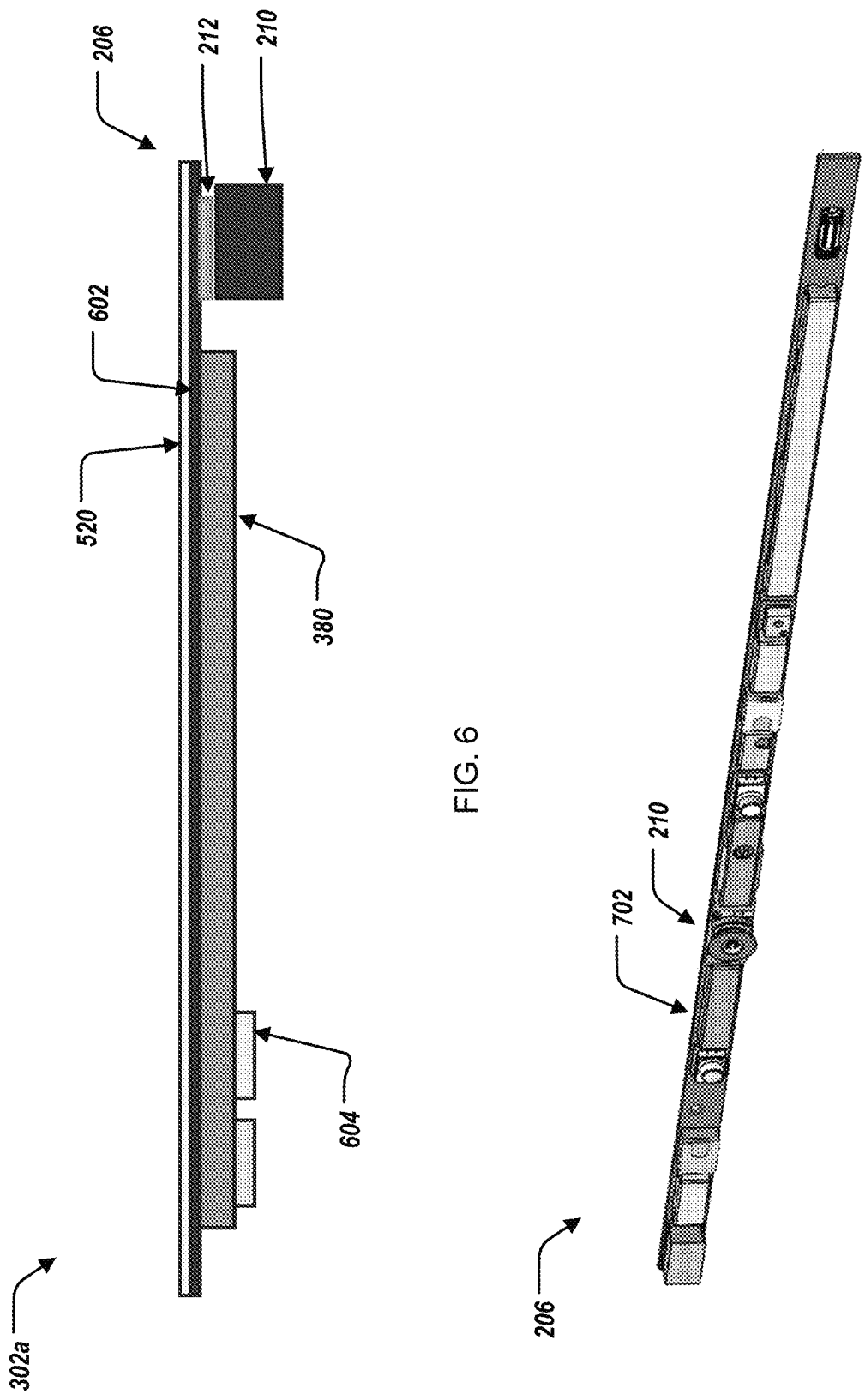
FIG. 6 illustrates a side cut-way view of the first body of the information handling system, in a further embodiment.
FIG. 7 illustrates the camera module, in a further embodiment.

FIG. 6 illustrates a further implementation of the camera module 206. Specifically, FIG. 6 illustrates a side cut-away view of the first body 302a of the information handling system 300. The first body 302a can further include a touch mesh 602. The touch mesh 602 can extend between the cover glass 520 and the display 380. The touch mesh 602 can detect user input provided to the information handling system 300—for example, touch user input on the cover glass 602. The touch mesh 602 can further extend between the camera module 206 and the cover glass 602. To that end, the touch mesh 602 can detect user input regarding changing the state of the electronic shutter 212 from the initial state 230 to the secondary state 232. Specifically, a touch computing module 604 in communication with the touch mesh 602 is configured to detect the user input.

For example, the touch computing module 208 can detect user input such as proximity, position and displacement, pressure, and force. For example, a user of the information handling system 202 can provide user input to the touch computing 208 by "touching" the touch mesh 602 proximate to the camera 210. The shutter controller computing module 204 is configured to receive a signal from the touch computing module 604 indicating user input. The shutter controller computing module 204 can process the signal, including determining that the signal indicates to change the state of the electronic shutter 212. The shutter controller computing module 204, in response to determining that the signal indicates to change the state of the electronic shutter 212, provides, to the camera module 206, a signal indicating to adjust an initial state 230 of the electronic shutter 212 to a secondary state 232. The touch mesh 602 eliminates the use of the FPC 402, and is fully integrated into the first body 302a.

FIG. 7 illustrates a further implementation of the camera module 206. Specifically, the camera module 206 can include an integrated computing sensor 702. The integrated computing system 702 can include a capacitive sensor (similar to the capacitive sensor 208) integrated with the shutter controller computing module (similar to the shutter controller computing module 204). That is, the first body 302a can include the shutter controller computing module. This eliminates the use of the FPC 402, and fully integrated into the first body 302a.

Figure 8A:
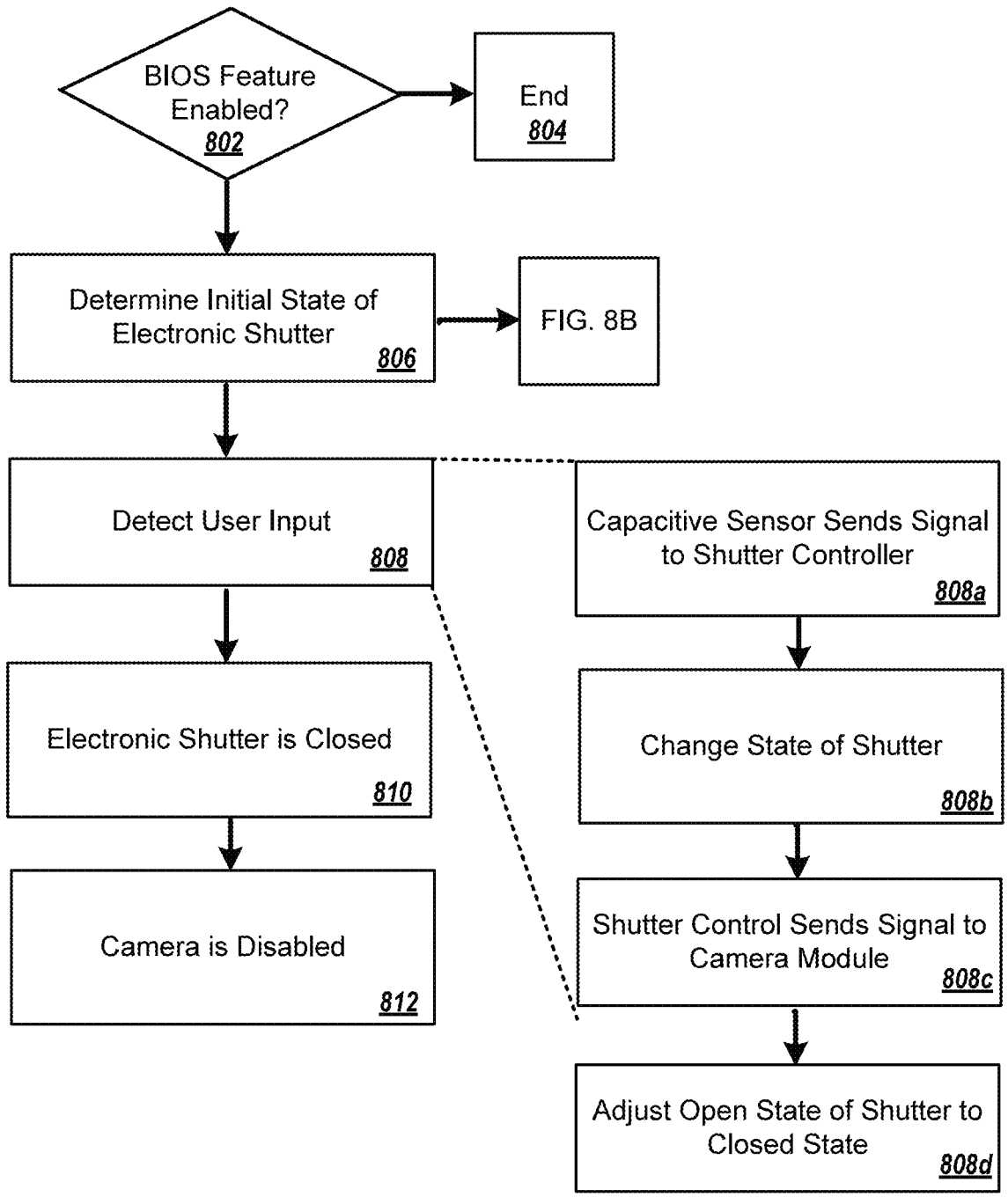
FIGS. 8A, 8B illustrates a flowchart for a method for adjusting a state of a camera module of the information handling system.
Figure 8B:
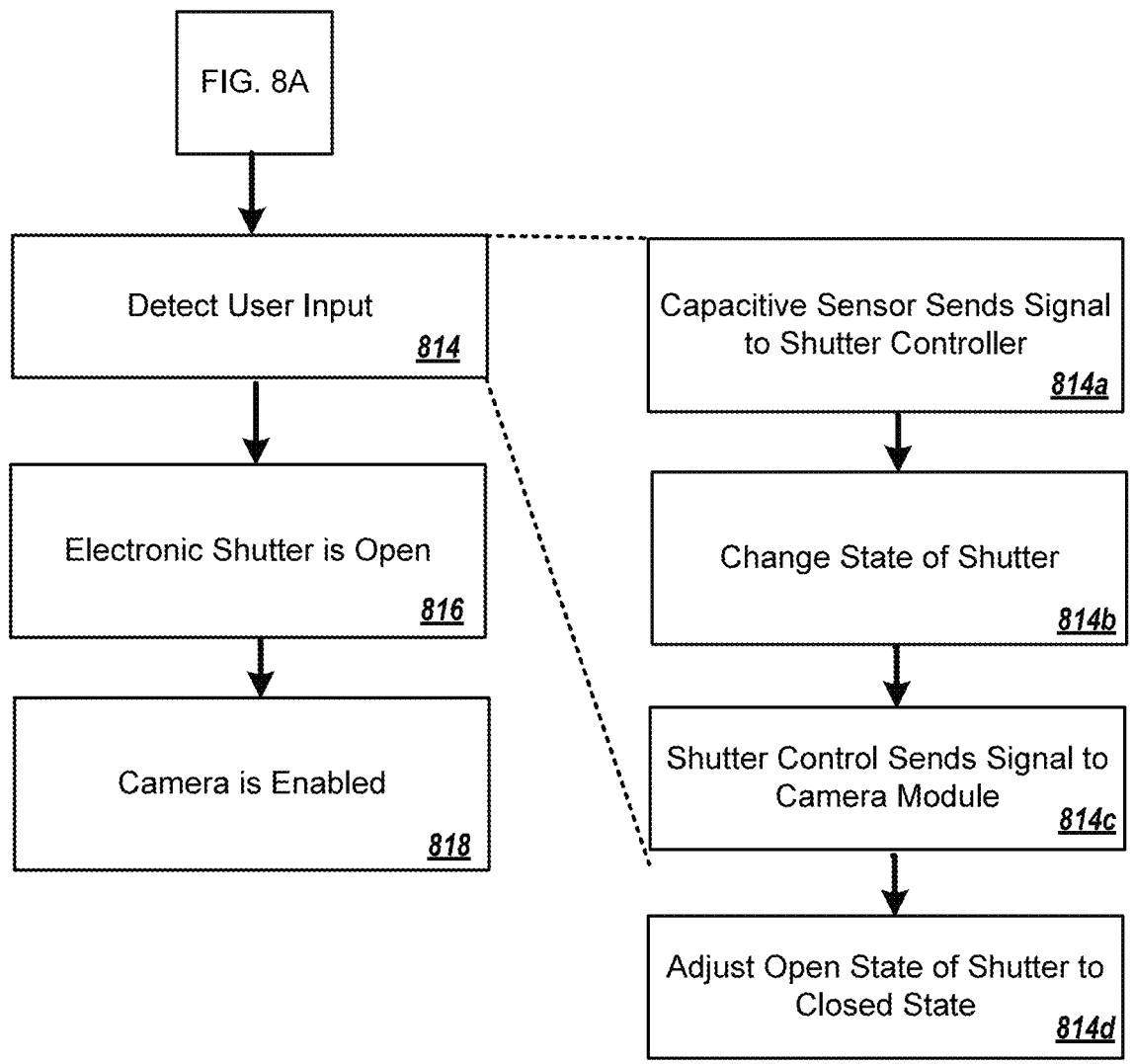

FIGS. 8A, 8B illustrates a flowchart depicting selected elements of an embodiment of a method 800 for adjusting a state of a camera module of an information handling system. The method 800 may be performed by the information handling system 100, the computing environment 200, the information handling system 202 and/or the shutter controller computing module 204, and with reference to FIGS. 1-7. It is noted that certain operations described in method 800 may be optional or may be rearranged in different embodiments.

The shutter controller computing module 204 determines whether a basic input/output system (BIOS) feature is enabled to adjust the state of the camera module (802). If the BIOS feature is not enabled, the process ends (804). If the BIOS feature is enabled, the shutter controller computing module 204 determines the initial state 230 of the electronic shutter 212 (806). If the shutter controller computing module 204 determines that the initial state 230 of the electronic shutter 212 is an open shutter state, the capacitive sensor 208 detects user input (808). Specifically, the capacitive sensor 208 sends the signal 220 to the shutter controller computing module 204 (808a). The shutter controller computing module 204 determines that the first signal 220 indicates to change the state of the electronic shutter 212 (808b). The shutter controller 204 sends the second signal 222 to the camera module 206 to adjust the initial state 230 (open state) of the electronic shutter 212 to the secondary state 232 (closed state) (808c). The camera module 206 adjusts the initial state 230 (open state) of the electronic shutter 212 to the secondary state 232 (closed state) based on the second signal 222 (808d). The electronic shutter 212 is closed (810). The camera 210 is disabled (812).

If the shutter controller computing module 204 determines that the initial state 230 of the electronic shutter 212 is a closed shutter state, the capacitive sensor 208 detects user input (814). Specifically, the capacitive sensor 208 sends the signal 220 to the shutter controller computing module 204 (814a). The shutter controller computing module 204 determines that the first signal 220 indicates to change the state of the electronic shutter 212 (814b). The shutter controller 204 sends the second signal 222 to the camera module 206 to adjust the initial state 230 (closed state) of the electronic shutter 212 to the secondary state 232 (open state) (814c). The camera module 206 adjusts the initial state 230 (closed state) of the electronic shutter 212 to the secondary state 232 (open state) based on the second signal 222 (814d). The electronic shutter 212 is open (816). The camera 210 is enabled (818).

Figure 9:
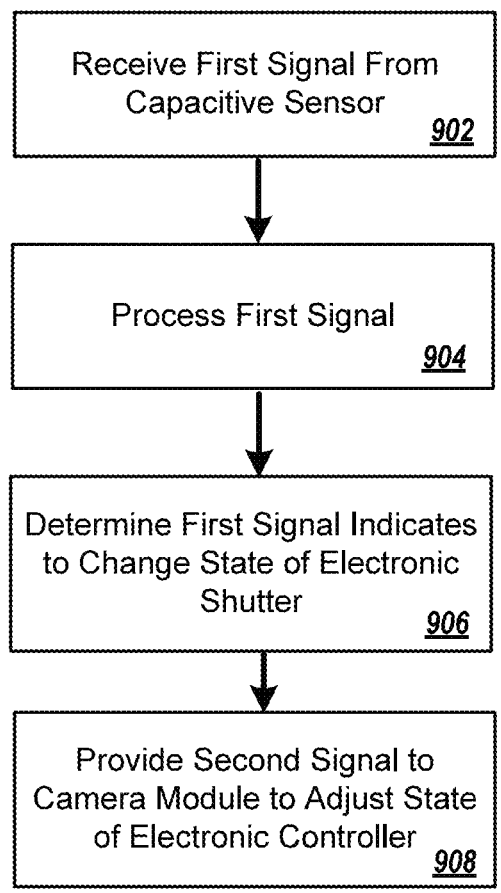
FIG. 9 illustrates a flowchart for a method for adjusting a state of a camera module of the information handling system.

FIG. 9 illustrates a flowchart depicting selected elements of an embodiment of a method 900 for adjusting a state of a camera module of an information handling system. The method 900 may be performed by the information handling system 100, the computing environment 200, the information handling system 202 and/or the shutter controller computing module 204, and with reference to FIGS. 1-7. It is noted that certain operations described in method 900 may be optional or may be rearranged in different embodiments.

The shutter controller computing module 204 receives the first signal 220 from the capacitive sensor 208 (902). The shutter controller computing module 204 processes the first signal 220 (904). The shutter controller computing module 204 determines that the first signal 220 indicates to change a state of the electronic shutter 212 (906). The shutter controller computing module 204 provides the second signal 222 to the camera module 206 to adjust the initial state 230 of the electronic shutter 212 to the secondary state 233 (908).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system, comprising:
   a display housing including a first side positioned opposite to a second side, and a top side positioned opposite to a bottom side;
   a display coupled to the display housing;
   a cover glass spaced-apart from the second side of the display housing, wherein the display is positioned between the cover glass and the second side of the display housing;
   a camera having an electronic shutter, the camera positioned at the top side of the display housing;
   a capacitive sensor configured to detect a change in capacitance at the capacitive sensor, the capacitive sensor positioned i) at the top side of the display housing and proximate to the camera, ii) positioned along a first axis with respect to the camera and offset a distance from the camera along the first axis such that the capacitive sensor does not overlap the camera, iii) adjacent the cover glass, and iv) between the cover glass and the second side of the display housing, wherein the cover glass covers the camera and the capacitive sensor;
   a processor having access to memory media storing instructions executable by the processor to perform operations comprising:
      receive a first signal from the capacitive sensor indicating the change in capacitance at the capacitive sensor;
      process the first signal from the capacitive sensor, including determining that the first signal indicates to change a state of the electronic shutter; and
      in response to determining that the first signal indicates to change the state of the electronic shutter, providing, to the camera module, a second signal to adjust an initial state of the electronic shutter of the camera to a secondary state.

2. The information handling system of claim 1, the operations further comprising:
   receive the second signal from the shutter control computing module; and
   in response to the second signal, adjust the initial state of the electronic shutter to the secondary state based on the second signal.

3. The information handling system of claim 2, wherein adjusting the initial state of the electronic shutter to the secondary state based on the second signal includes actuating the electronic shutter.

4. The information handling system of claim 1, wherein the initial state is a closed shutter state, and the secondary state is an open shutter state.

5. The information handling system of claim 1, wherein the initial state is an open shutter state, and the secondary state is a closed shutter state.

6. The information handling system of claim 1, wherein the capacitive sensor detects the change of capacitance along the capacitive sensor in a first direction, the operations further comprising providing, to the camera module, the second signal to adjust a closed shutter state of the electronic shutter of the camera to an open shutter state based on the change of capacitance along the capacitive sensor in the first direction.

7. The information handling system of claim 1, wherein the capacitive sensor detects the change of capacitance along the capacitive sensor in a second direction, the operations further comprising providing, to the camera module, the second signal to adjust an open shutter state of the electronic shutter of the camera to a closed shutter state based on the change of capacitance along the capacitive sensor in the second direction.

8. A dual-body information handling system, comprising:
   a first body, including:
      a display housing including a first side positioned opposite to a second side, and a top side positioned opposite to a bottom side;
      a display coupled to the display housing;
      a cover glass spaced-apart from the second side of the display housing, wherein the display is positioned between the cover glass and the second side of the display housing;

a camera having an electronic shutter, the camera positioned at the top side of the display housing;

a capacitive sensor configured to detect a change in capacitance at the capacitive sensor, the capacitive sensor positioned i) at the top side of the display housing and proximate to the camera, ii positioned along a first axis with respect to the camera and offset a distance from the camera along the first axis such that the capacitive sensor does not overlap the camera, iii) adjacent the cover glass, and iv) between the cover glass and the second side of the display housing, wherein the cover glass covers the camera and the capacitive sensor;

a second body, coupled to the first body with a hinging apparatus, the second body including:

a processor having access to memory media storing instructions executable by the processor to perform operations comprising:

receive a first signal from the capacitive sensor indicating the change in capacitance at the capacitive sensor;

process the first signal from the capacitive sensor, including determining that the first signal indicates to change a state of the electronic shutter; and in response to determining that the first signal indicates to change the state of the electronic shutter, providing, to the camera module, a second signal to adjust an initial state of the electronic shutter of the camera to a secondary state.

9. The information handling system of claim 8, the operations further comprising:

receive the second signal from the shutter control computing module; and in response to the second signal, adjust the initial state of the electronic shutter to the secondary state based on the second signal.

10. The information handling system of claim 9, wherein adjusting the initial state of the electronic shutter to the secondary state based on the second signal includes actuating the electronic shutter.

11. The information handling system of claim 8, wherein the initial state is a closed shutter state, and the secondary state is an open shutter state.

12. The information handling system of claim 8, wherein the initial state is an open shutter state, and the secondary state is a closed shutter state.

13. The information handling system of claim 8, wherein the capacitive sensor detects the change of capacitance along the capacitive sensor in a first direction, the operations further comprising providing, to the camera module, the second signal to adjust a closed shutter state of the electronic shutter of the camera to an open shutter state based on the change of capacitance along the capacitive sensor in the first direction.

14. The information handling system of claim 8, wherein the capacitive sensor detects the change of capacitance along the capacitive sensor in a second direction, the operations further comprising providing, to the camera module, the second signal to adjust an open shutter state of the electronic shutter of the camera to a closed shutter state based on the change of capacitance along the capacitive sensor in the second direction.

15. A computer-implemented method of adjusting a state of a camera module of an information handling system, the method comprising:

receive a first signal from a capacitive sensor indicating a change in capacitance at the capacitive sensor, the capacitive sensor in communication with a camera;

process the first signal from the capacitive sensor, including determining that the first signal indicates to change a state of an electronic shutter, the camera including the electronic shutter; and in response to determining that the first signal indicates to change the state of the electronic timer, providing, to the camera module, a second signal to adjust an initial state of the electronic shutter of the camera to a secondary state, wherein the capacitive sensor is positioned at a top side of a display housing, the display housing includes a first side positioned opposite to a second side, and the top side positioned opposite to a bottom side, wherein the capacitive sensor is positioned proximate to the camera that is positioned at the top side of the display housing, wherein the capacitive sensor is positioned along a first axis with respect to the camera and offset a distance from the camera along the first axis such that the capacitive sensor does not overlap the camera, wherein the capacitive sensor is positioned adjacent to a cover glass, the cover glass spaced-apart from the second side of the display housing, wherein a display is positioned between the cover glass and the second side of the display housing, wherein the capacitive sensor is positioned between the cover glass and the second side of the display housing, wherein the cover glass covers the camera and the capacitive sensor.

16. The computer-implemented method of claim 15, wherein adjusting the initial state of the electronic shutter to the secondary state based on the second signal includes actuating the electronic shutter.

17. The computer-implemented method of claim 15, wherein the initial state is a closed shutter state, and the secondary state is an open shutter state.

18. The computer-implemented method of claim 15, wherein the initial state is an open shutter state, and the secondary state is a closed shutter state.

19. The computer-implemented method of claim 15, wherein the change of capacitance is in a first direction, the method further comprising providing, to the camera module, the second signal to adjust a closed shutter state of the electronic shutter of the camera to an open shutter state based on the change of capacitance along the capacitive sensor in the first direction.

20. The computer-implemented method of claim 15, wherein the change of capacitance is in a second direction, the method further comprising providing, to the camera module, the second signal to adjust an open shutter state of the electronic shutter of the camera to a closed shutter state based on the change of capacitance along the capacitive sensor in the second direction.

* * * * *